United States Patent
Miura et al.

(10) Patent No.: US 9,998,589 B2
(45) Date of Patent: Jun. 12, 2018

(54) MOBILE PHONE FOR UNLOCKING A LOCK SCREEN BY A PHYSICAL KEY PRESS

(71) Applicant: KYOCERA Corporation, Kyoto (JP)

(72) Inventors: Saya Miura, Yokohama (JP); Kazuki Morita, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/420,225

(22) Filed: Jan. 31, 2017

(65) Prior Publication Data
US 2017/0223178 A1 Aug. 3, 2017

(30) Foreign Application Priority Data
Feb. 1, 2016 (JP) .................................. 2016-017180

(51) Int. Cl.
*H04M 1/725* (2006.01)
(52) U.S. Cl.
CPC ..... *H04M 1/72597* (2013.01); *H04M 1/7258* (2013.01); *H04M 1/72583* (2013.01)
(58) Field of Classification Search
CPC ....... H04M 1/67; H04W 12/06; H04W 12/08; H04W 24/02
USPC ................... 455/410, 411, 412.1, 414.1, 418
See application file for complete search history.

(56) References Cited

U.S. PATENT DOCUMENTS

| 2009/0303185 | A1* | 12/2009 | Larsen | H04M 1/7258 345/168 |
| 2010/0146437 | A1* | 6/2010 | Woodcock | G06Q 30/06 715/806 |
| 2012/0165961 | A1* | 6/2012 | Folscheid | G06F 21/81 700/17 |
| 2015/0207922 | A1* | 7/2015 | Kobayashi | H04M 1/67 455/411 |

FOREIGN PATENT DOCUMENTS

| JP | 2006-050501 A | 2/2006 |
| JP | 2007-188265 A | 7/2007 |
| JP | 2011-059827 A | 3/2011 |
| JP | 2013-026733 A | 2/2013 |
| JP | 2014-067247 A | 4/2014 |
| JP | 2014-235526 A | 12/2014 |
| JP | 2015-228249 A | 12/2015 |
| WO | 2009/051048 A1 | 4/2009 |

* cited by examiner

*Primary Examiner* — Sam Bhattacharya
(74) *Attorney, Agent, or Firm* — Studebaker & Brackett PC

(57) ABSTRACT

This feature phone type mobile phone includes a physical key and a display that displays a lock screen. While displaying a notification on the lock screen, the mobile phone transitions to a screen corresponding to the notification in response to a short press operation on the physical key, and while displaying a notification on the lock screen, the mobile phone transitions to a home screen in response to a long press operation on the physical key.

4 Claims, 4 Drawing Sheets

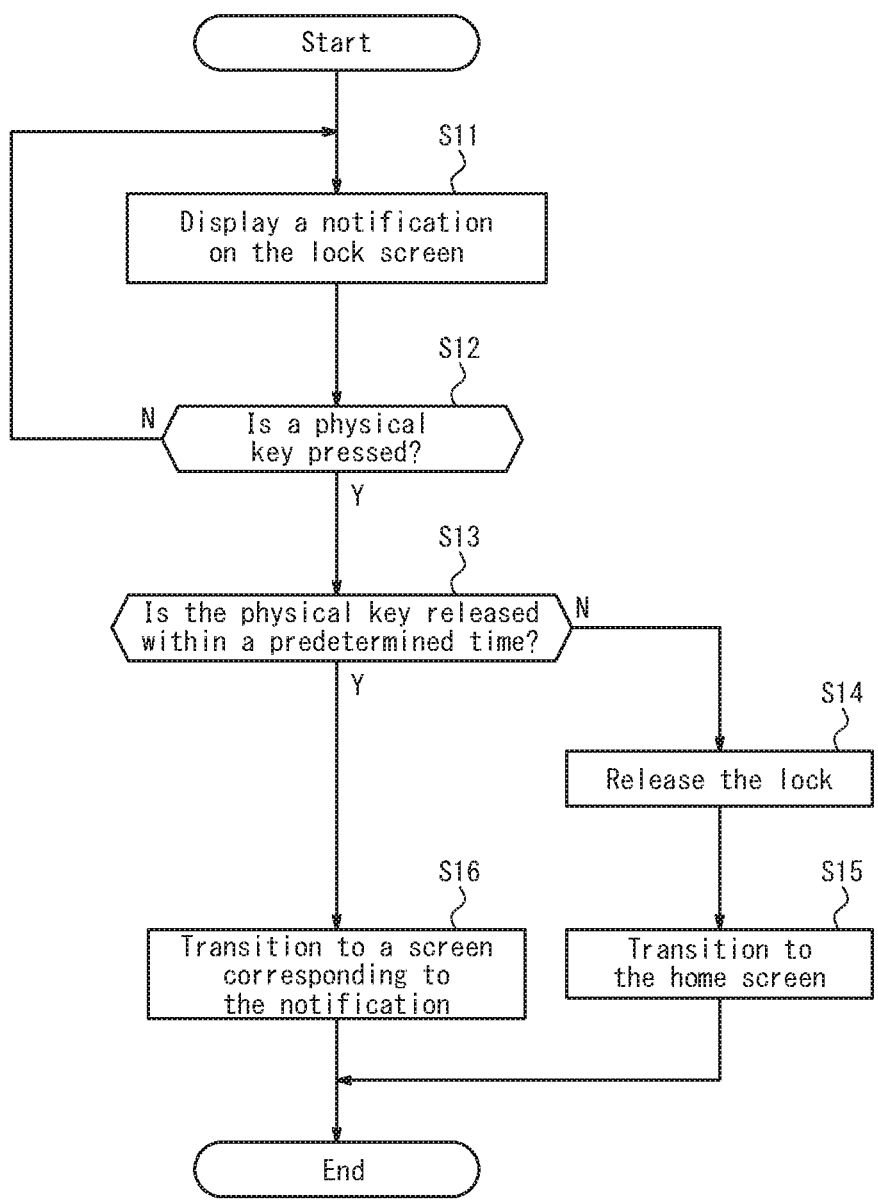

MOBILE PHONE FOR UNLOCKING A LOCK SCREEN BY A PHYSICAL KEY PRESS

TECHNICAL FIELD

This disclosure relates to a mobile phone. In greater detail, this disclosure relates to a feature phone type mobile phone.

BACKGROUND

In many of the mobile phones such as smartphones that are currently being sold, a lock screen is displayed on a screen configured by a touch panel when the power is turned on, and operations other than a predetermined operation are invalid (for example, see JP 2014-67247 A (PTL 1)).

CITATION LIST

Patent Literature

PTL 1: JP 2014-67247 A

SUMMARY

A feature phone type mobile phone according to this disclosure includes: a display configured to display a lock screen; and a physical key; such that while displaying a notification on the lock screen, the mobile phone transitions to a screen corresponding to the notification in response to a short press operation on the physical key; and while displaying a notification on the lock screen, the mobile phone transitions to a home screen in response to a long press operation on the physical key.

BRIEF DESCRIPTION OF THE DRAWINGS

In the accompanying drawings:

FIG. 3 is a flowchart illustrating operations of a mobile phone according to one of the embodiments of this disclosure.

DETAILED DESCRIPTION

On many of the mobile phones that are currently being sold, notification of various information, such as a missed call or receipt of e-mail (mail), is displayed on such a lock screen. In the case of a smartphone, for example by the user flicking the touch panel outside of the area where the notification is displayed, the smartphone for example can transition to a home screen. If the user taps the touch panel in the area where the notification is displayed, the smartphone can transition to a screen corresponding to the notification. For example, if the user taps the area where the notification of a missed call is displayed, then the smartphone can display information on the missed call or transition to a screen for dialing the number of the party that placed the missed call. As another example, by tapping the area where the notification of received mail is displayed, the user can launch a mail application (application software) and display the body of the received mail.

In addition to smartphones, if mobile phones such as feature phones could also implement an easy-to-operate notification function, feature phone type mobile phones would become more convenient.

It would therefore be helpful to provide a more convenient feature phone type mobile phone.

According to an embodiment of this disclosure, a feature phone type mobile phone can be made more convenient.

The following describes an embodiment of this disclosure with reference to the drawings.

In the embodiment described below, a folding feature phone (flip phone or clamshell phone) is described as an example of a feature phone type mobile phone. Embodiments of this disclosure, however, are not limited to folding phones and may be another type of feature phone, such as a slide phone that is slid to reveal a keyboard, a bar phone (straight phone), or the like.

Figure 1:
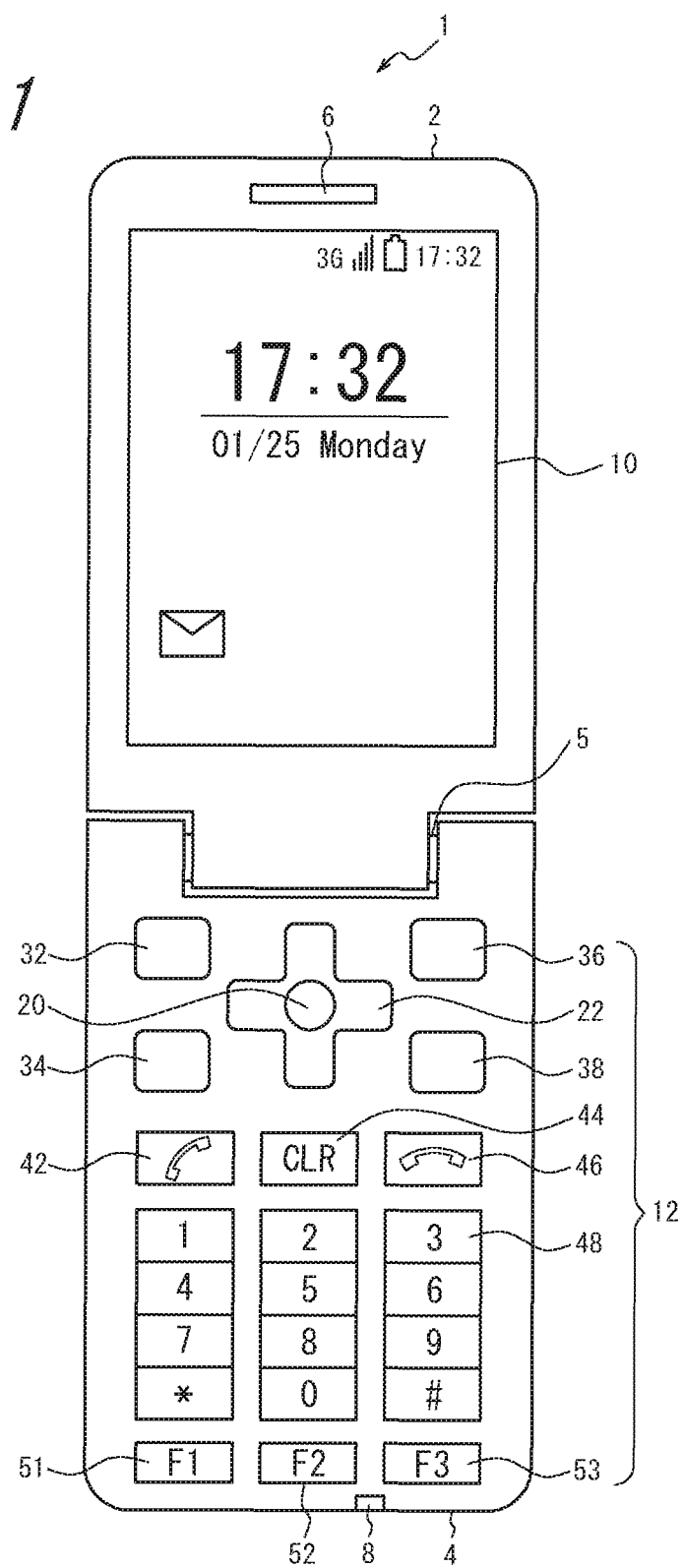
FIG. 1 is an external view of a mobile phone according to one of the embodiments of this disclosure.

FIG. 1 is an external view of a mobile phone according to one of the embodiments of this disclosure.

As illustrated in FIG. 1, the feature phone type mobile phone 1 according to this embodiment is a folding mobile phone in which an upper housing 2 and a lower housing 4 are connected by a hinge 5. In this mobile phone 1, the upper housing 2 and the lower housing 4 can, for example, be folded with the hinge 5 as the valley of the fold. Since the external structure of the mobile phone 1 can be similar to that of a well-known folding feature phone type mobile phone, a more detailed explanation is omitted.

As illustrated in FIG. 1, the mobile phone 1 includes a speaker 6 and display 10 on the upper housing 2 side. On the lower housing 4 side, the mobile phone 1 also includes a microphone 8 and a physical key section (keyboard) 12 configured by various types of physical keys. The speaker 6 outputs voice to the user's ear during a phone call, and the microphone 8 acquires voice emitted from the user's mouth during a phone call. Since the speaker 6 and the microphone 8 may be similar to those used in a typical mobile phone, a more detailed explanation is omitted. The physical key section 12 detects input from the user who operates the mobile phone 1.

The display 10 is a display device such as a liquid crystal display, an organic EL display, an inorganic EL display, or the like. The display 10 may be provided with a light source or light-emitting element used as a backlight. The display 10 displays a variety of information to the user operating the mobile phone 1, such as characters, symbols, images, objects for operation (icons), and the like.

The physical key section 12 includes a center key (enter key) 20 that is a physical key, a direction key (cursor key) 22, a menu key 32, a mail key 34, a camera key 36, a web key 38, a talk key 42, a clear key 44, a hang-up/power key 46, numeric keys 48, and three function keys 51, 52, and 53. The numeric keys 48 include number keys from 0 to 9 and other symbol keys. The keys constituting the physical key section 12 may be configured as push-button type automatic return switches or the like. Since the functions of the keys constituting the physical key section 12 may be similar to those of a typical mobile phone, a more detailed explanation is omitted. In FIG. 1, the characters or symbols stamped on the key tops of the keys constituting the physical key section 12 are simplified or omitted as appropriate.

Figure 2:
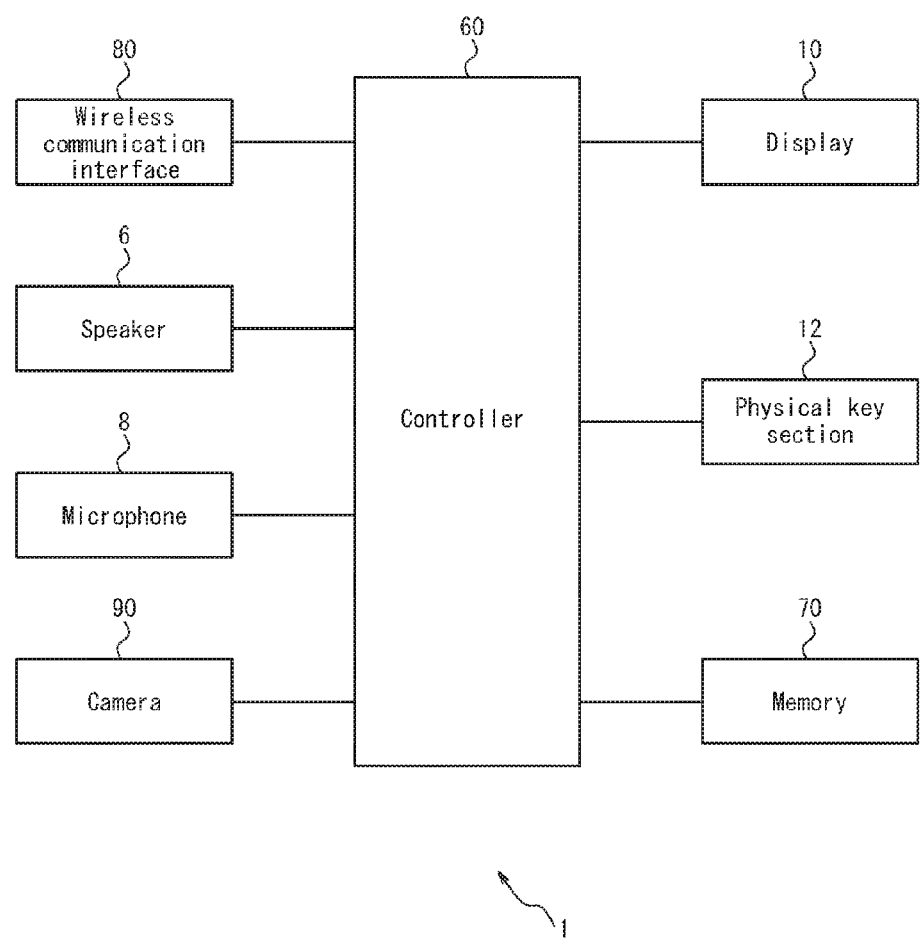
FIG. 2 is a block diagram schematically illustrating the structure of a mobile phone according to one of the embodiments of this disclosure.

FIG. 2 is a block diagram schematically illustrating the structure of a mobile phone according to one of the embodiments of this disclosure.

As illustrated in FIG. 2, in terms of functionality, the mobile phone 1 includes the display 10, the physical key section 12, and a controller 60. As described with reference to FIG. 1, the mobile phone 1 also includes the speaker 6 and the microphone 8 in order to implement the functions of a mobile phone. As illustrated in FIG. 2, the mobile phone 1 also includes a memory 70 and a wireless communication interface 80. Furthermore, the mobile phone 1 may include other components as appropriate, such as a camera 90 for capturing photographs or video.

The controller 60 may be configured by a processor that, starting with the functional blocks of the mobile phone 1, controls and manages the mobile phone 1 overall. The controller 60 may be a processor such as a CPU that executes a program prescribing control procedures. The program executed by the controller 60 may, for example, be stored in the memory 70, on an external storage medium, or the like.

The memory 70 may be configured by a storage apparatus such as a semiconductor memory. The memory 70 stores a variety of information, programs for causing the mobile phone 1 to operate, and the like and also functions as a working memory. The memory 70 may, for example, be configured to include RAM and ROM or the like. The memory 70 for example stores certain programs corresponding to applications to cause the controller 60 to execute particular functions, and also stores text data for mail, image data, and the like.

The wireless communication interface 80 for example connects to a communication network by wireless communication over an antenna with a wireless communication base station and executes functions for the mobile phone 1 to place a phone call, engage in data communication, and like. Since the wireless communication interface 80 can be configured similarly as the components for implementing the wireless communication function of a regular smartphone or feature phone, a more detailed explanation is omitted.

The camera 90 is a component for implementing the function of a digital camera that can capture still images or video. The data of the still images or video captured by the camera 90 may, for example, be saved in the memory 70. Since the camera 90 can be configured in a similar way as the camera provided in a regular smartphone or feature phone, a more detailed explanation is omitted.

Next, operations of the mobile phone 1 according to this embodiment are described.

The mobile phone 1 according to this embodiment makes a feature phone type mobile phone more convenient by implementing an easy-to-operate notification function. As described above, the notification may be for various information, such as a missed call or receipt of e-mail. In this embodiment, it is assumed that at the point in time at which there occurs a predetermined event for which notification should be displayed, a notification can be displayed on the lock screen.

For reasons such as security and prevention of erroneous operation, feature phones such as the mobile phone 1 are often configured so that for example when the power is turned on, or the phone is opened from the folded state, a lock screen is displayed, and operations other than certain limited operations are invalid. In this state in which the lock screen is displayed, the number of physical keys allowed to be operated (i.e. for which operation is not invalid) is preferably reduced insofar as possible in keeping with the purpose of the lock screen. Accordingly, in this embodiment, by operating only a limited number of physical keys, it is possible both to transition from the lock screen to the home screen and to transition from the lock screen to a screen corresponding to a notification.

The following describes operations of the mobile phone 1 in the case of a notification being displayed on the lock screen.

FIG. 3 is a flowchart illustrating processing for operations of a mobile phone according to one of the embodiments of this disclosure.

Upon the start of processing illustrated in FIG. 3, the controller 60 of the mobile phone 1 performs control to display a lock screen on the display 10 (step S11). As described above, in the state in which the lock screen is displayed in step S11, the controller 60 invalidates operations on keys other than the center key 20, which is a physical key, and the direction key 22 (locked state).

The following describes the case of a notification also being displayed on the lock screen that is displayed on the display 10 in step S11. Such a case may, for example, be envisioned as the case of an event that displays a notification occurring and the notification being displayed on the display 10 while the lock screen is displayed on the display 10. It may also be the case that, for example, an event that displays a notification occurs, and after the notification is displayed on the lock screen, a sleep state is entered for a reason such as the elapse of a predetermined time; when the lock screen is displayed again, the notification is displayed. When a notification is displayed, a notification sound and/or vibration may be generated. Therefore, it may also be the case that a notification has already been displayed on the lock screen at the time that a user who became aware of the notification as a result of the notification sound and/or the vibration checks the lock screen.

Figure 4A:
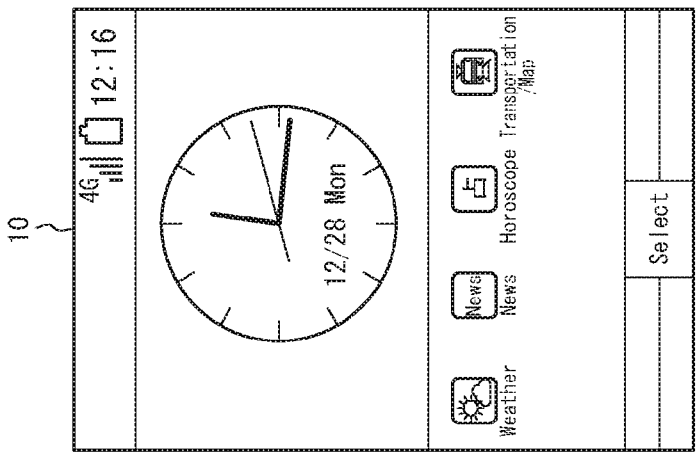
FIGS. 4A, 4B, and 4C illustrate operations of a mobile phone according to one of the embodiments of this disclosure.

In this way, a notification can be displayed on the lock screen, for example as illustrated in FIG. 4A. In the example illustrated in FIG. 4A, when the lock screen is displayed on the display 10, two notifications are displayed: a missed call and received mail. In a locked state displaying such a lock screen, only operations on the center key 20, which is a physical key, and the direction key 22 are valid, whereas operations on other keys are invalid as a general rule. For example in the lock screen illustrated in FIG. 4A, however, the menu key 32 (FIG. 1) for example may be made valid as a key for performing a special operation such as an emergency report.

Once a notification is displayed on the lock screen in step S11, the controller 60 determines whether a push has been detected on the center key 20 (step S12). When a push is not detected on the center key 20 in step S12, the controller 60 returns to step S11 and maintains the state in which the lock screen is displayed on the display 10.

If a press on the center key 20 is detected in step S12, the controller 60 determines whether the press on the center key 20 was released within a predetermined time (step S13). In this embodiment, when the center key 20 is released within a predetermined time after being pressed, the operation is determined to be a "short press", whereas when the press is not released within the predetermined time, the operation is determined to be a "long press". Accordingly, the "predetermined time" may be set to a time suitable for distinguishing between a long press operation and a short press operation, such as a time of 1.5 seconds.

When release is not detected within the predetermined time in step S13 (long press), the controller 60 releases the locked state (step S14) and transitions the lock screen displayed on the display 10 to display of the home screen (step S15). In step S15, on the display 10 the controller 60 can display the home screen that allows user operation, as illustrated for example in FIG. 4C.

In this way, while the notification is displayed on the lock screen, the mobile phone 1 according to this embodiment can release the locked state in response to the user performing a long press operation on the center key 20. In other words, the mobile phone 1 can transition to a home screen such as the one illustrated in FIG. 4C in response to a long press operation on the center key 20 on the lock screen illustrated in FIG. 4A.

On the other hand, when release is detected within the predetermined time in step S13 (short press), the controller 60 transitions to display of the screen corresponding to the notification displayed on the display 10 (step S16). In the example illustrated in FIG. 4A, when the lock screen is displayed on the display 10, two notifications are displayed: a missed call and received mail. In response to a short press operation on the center key 20 on the lock screen illustrated in FIG. 4A, the mobile phone 1 can transition to display of a screen corresponding to the notification, such as the one illustrated in FIG. 4B.

Figure 4B:
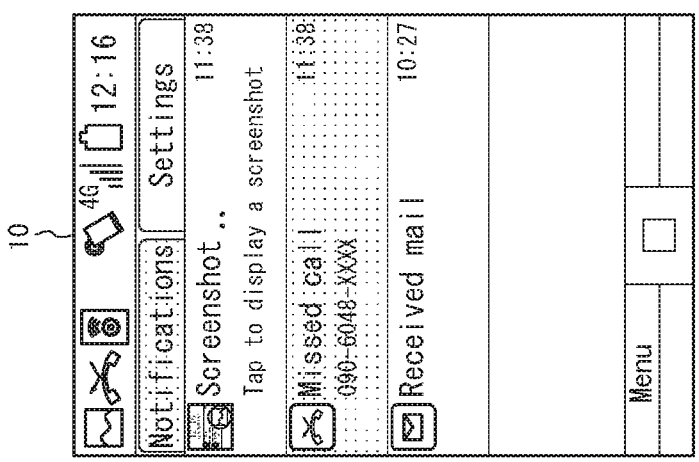
Figure 4C:
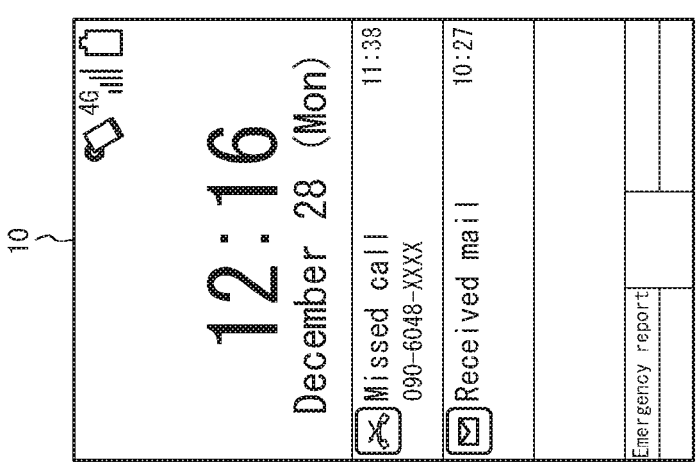

Furthermore, when a screen corresponding to a plurality of notifications is displayed, as illustrated in FIG. 4B, and the user performs an operation to select one of the notifications, the controller 60 may respond by transitioning to a screen corresponding to the selected notification. In this case, in response to a short press operation on the center key 20, which is a physical key, while a notification displayed on the display 10 is selected, the controller 60 may transition to a screen corresponding to the selected notification.

For example, in the example illustrated in FIG. 4B, among the two notifications for a missed call and received mail, the notification for a missed call is displayed as being selected. In this state, as a result of a short press operation on the center key 20, which is a physical key, the controller 60 may transition to a screen corresponding to the selected notification for a missed call. In this case, for example the controller 60 may transition the display on the display 10 to a screen that allows the number of the party that placed the missed call to be dialed.

For example in the example illustrated in FIG. 4B, the controller 60 may appropriately display one of the notifications displayed on the display 10 as being selected as a result of detecting an operation in which the user changes the selected item using the direction key 22. For example, in the example illustrated in FIG. 4B, the controller 60 may change the selected item that is displayed as selected from the "missed call" to the "received mail" as a result of detecting an operation in which the user presses the "down" portion of the direction key 22. While a notification displayed on the display 10 is selected, the controller 60 may also transition to the home screen as a result of a long press operation on the center key 20, which is a physical key.

Furthermore, when notifications are displayed on the lock screen illustrated for example in FIG. 4A, one of the notifications may be displayed as being selected in advance. With this configuration, from the lock screen such as the one illustrated in FIG. 4A, a screen corresponding to the selected notification can be transitioned to directly without passing through the screen illustrated for example in FIG. 4B.

In the operations illustrated in FIG. 3, after displaying a notification on the lock screen in step S11, the controller 60 may transition to a sleep mode, for example, when the lock screen is not released for a relatively long time in step S12, such as 30 seconds. In this case, once the sleep state is exited, the controller 60 preferably displays the lock screen again in step S11 and continues with the subsequent processing.

In this way, in this embodiment, while displaying a notification on the lock screen on the display 10, the controller 60 transitions to a screen corresponding to the notification as a result of a short press operation on the center key 20, which is a physical key. Also, in this embodiment, while displaying a notification on the lock screen on the display 10, the controller 60 transitions to the home screen as a result of a long press operation on the center key 20, which is a physical key.

If the center key 20, which is a physical key, is pressed and released within a predetermined time, the controller 60 preferably determines that a short press operation was performed. On the other hand, if the center key 20, which is a physical key, is pressed but is not released within the predetermined time, the controller 60 preferably determines that a long press operation was performed.

In response to a short press operation on the center key 20, which is a physical key, while a notification displayed on the display 10 is selected, the controller 60 preferably transitions to a screen corresponding to the selected notification. In response to a long press operation on the center key 20, which is a physical key, while a notification displayed on the display 10 is selected, the controller 60 preferably transitions to the home screen.

In this way, with the mobile phone 1 according to this embodiment, even a feature phone type mobile phone can implement a notification function like a smartphone. In other words, with the mobile phone 1 according to this embodiment, a notification can be displayed on the lock screen, user operation corresponding to the notification can be detected, and a corresponding operation can be performed. Therefore, with the mobile phone 1 according to this embodiment, a feature phone type mobile phone can be made more convenient.

Although this disclosure is based on the accompanying drawings and examples, it is to be noted that various changes and modifications will be apparent to those skilled in the art based on this disclosure. Therefore, such changes and modifications are to be understood as included within the scope of this disclosure. For example, the functions and the like included in the various functional components, means, and steps may be reordered in any logically consistent way. Furthermore, functional components or steps may be combined into one or divided. The above embodiments of this disclosure are not limited to being implemented precisely as described and may be implemented by combining or partially omitting the features thereof.

For example, in the above embodiment, the operation executed in response to a "long press" operation and the operation executed in response to a "short press" operation may be reversed. In the above embodiment, letting one of the "long press" and the "short press" be a first operation and the other a second operation, it suffices for these to be detectable as different operations. Accordingly, the first operation and the second operation may correspond to any of a variety of distinguishable operations, such as a short press, long press, single click, double-click, and the like.

The invention claimed is:
1. A feature phone type mobile phone, comprising:
a display configured to display a lock screen; and
a physical key, wherein while displaying a notification on the lock screen, the mobile phone transitions to a screen corresponding to the notification in response to a short press operation on the physical key, while displaying a notification on the lock screen, the mobile phone transitions to a home screen, which is different from the screen corresponding to the notification, in response to a long press operation on the physical key, the mobile phone determines that the short press operation has occurred when the physical key is pressed and released within a predetermined time, and the mobile phone determines that the long press operation has occurred when the physical key is pressed and is not released within the predetermined time.

2. A feature phone type mobile phone, comprising:

a display configured to display a lock screen; and a physical key, wherein while displaying a notification on the lock screen, the mobile phone transitions to a screen corresponding to the notification in response to a short press operation on the physical key, while displaying a notification on the lock screen, the mobile phone transitions to a home screen, which is different from the screen corresponding to the notification, in response to a long press operation on the physical key, while a notification displayed on the display is selected, the mobile phone transitions to a screen corresponding to the notification in response to a short press operation on the physical key, while a notification displayed on the display is selected, the mobile phone transitions to the home screen in response to a long press operation on the physical key, the mobile phone determines that the short press operation has occurred when the physical key is pressed and released within a predetermined time, and the mobile phone determines that the long press operation has occurred when the physical key is pressed and is not released within the predetermined time.

3. A feature phone type mobile phone, comprising:

a display configured to display a lock screen; and a physical key; wherein while displaying a notification on the lock screen, the mobile phone transitions to a screen corresponding to the notification in response to a short press operation on the physical key; and while displaying a notification on the lock screen, the mobile phone transitions to a home screen, which is different from the screen corresponding to the notification, in response to a long press operation on the physical key.

4. The mobile phone of claim 3, wherein while a notification displayed on the display is selected, the mobile phone transitions to a screen corresponding to the notification in response to a short press operation on the physical key; and while a notification displayed on the display is selected, the mobile phone transitions to the home screen in response to a long press operation on the physical key.

* * * * *